United States Patent [19]

Wilcox et al.

[11] Patent Number: 4,745,948
[45] Date of Patent: May 24, 1988

[54] COUPLING DEVICE

[75] Inventors: Wayne E. Wilcox, Union City; Michael J. Varasso, Corry, both of Pa.

[73] Assignee: Snap-Tite, Inc., Union City, Pa.

[21] Appl. No.: 501,082

[22] Filed: Jun. 6, 1983

[51] Int. Cl.⁴ ............................................. F16L 37/28
[52] U.S. Cl. .................................. 137/614.05; 137/614
[58] Field of Search ............................. 137/614.05, 614

[56] References Cited

U.S. PATENT DOCUMENTS

| 3,348,575 | 10/1967 | Simak | 137/614.05 |
|---|---|---|---|
| 3,482,602 | 12/1969 | Jarnagan et al. | 137/614.05 |
| 3,530,887 | 9/1970 | Stratman | 137/614.05 |
| 3,646,964 | 3/1972 | Stratman | 137/614.05 |
| 4,200,121 | 4/1980 | Walter et al. | 137/614 |
| 4,398,561 | 8/1983 | Maldavs | 137/614.05 |

FOREIGN PATENT DOCUMENTS 0086130  8/1973  France ................................ 137/614

Primary Examiner—A. Michael Chambers
Attorney, Agent, or Firm—Woodling, Krost & Rust

[57] ABSTRACT

A coupling device for detachably connecting male and female coupling members which serve to provide a fluid connection between a fluid source and an implement operated from the fluid source. Check valves are provided in both of the coupler members and an actuating means is provided for engaging the check valve in the male coupler to insure against closing of the male coupler check valve during fluid flow through the coupling device. A fluid actuated lock means is provided to hold the actuating member in its operative position.

10 Claims, 3 Drawing Sheets

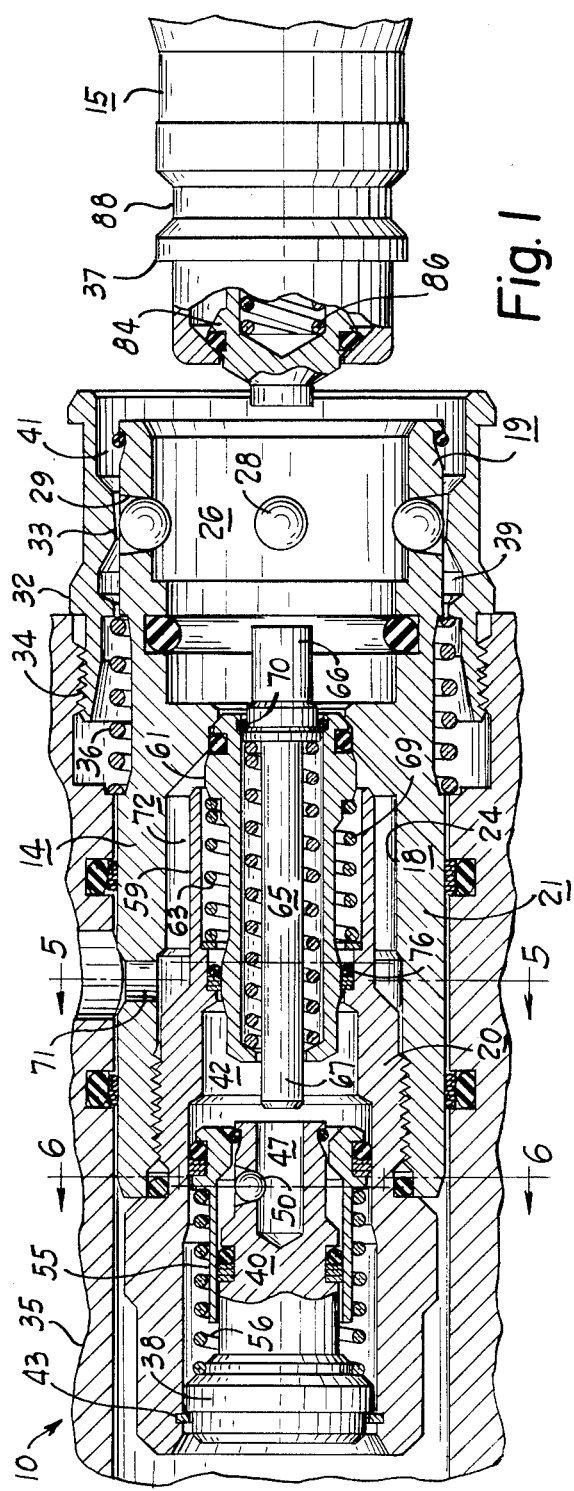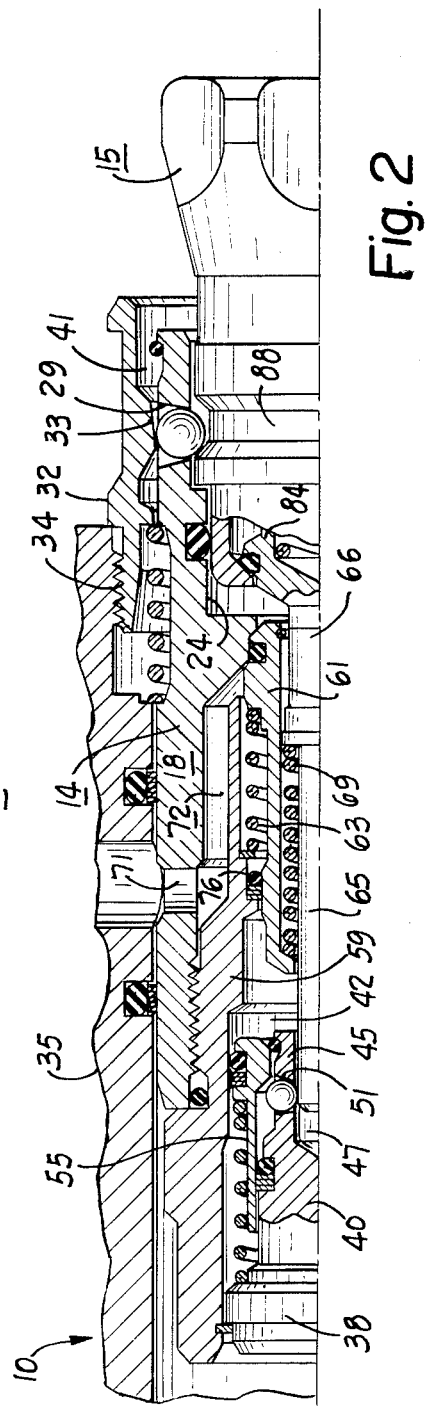

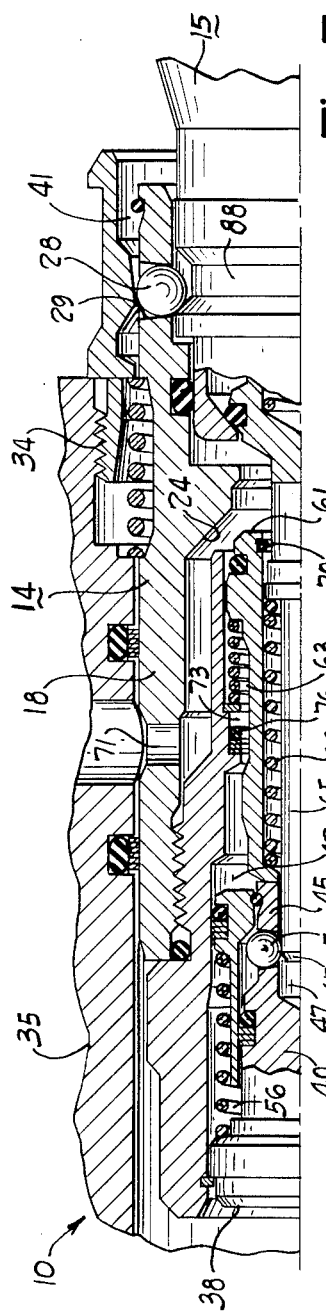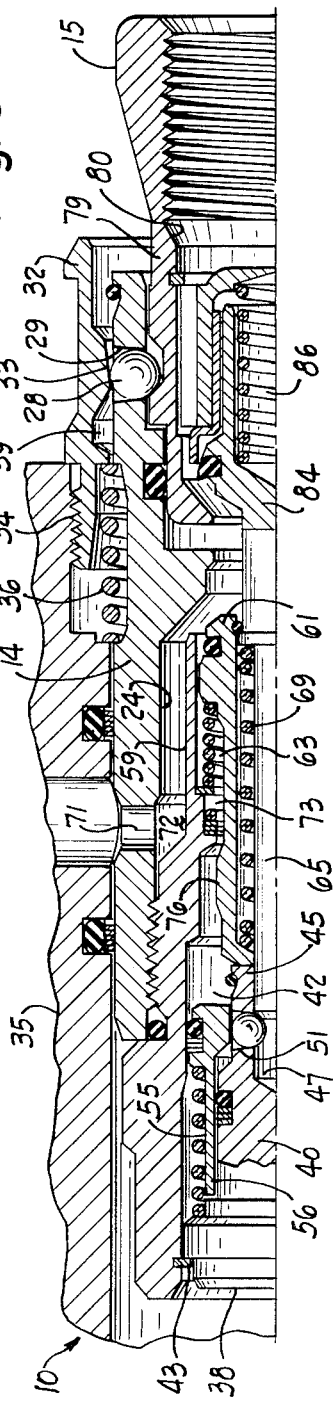

COUPLING DEVICE

The present invention relates in general to coupling devices which serve for example to connect a source of hydraulic fluid to a device to be actuated by the hydraulic fluid. An example of this would be to connect a hydraulic pump on a tractor to the lift mechanism on an implement such as a plow. In the devices to which the present invention relates the male and female couplers are capable of connection when under pressure, without opening check valves in the respective couplers. In coupled condition the check valves in the male and female couplers are operably interconnected in such manner that by turning the source of hydraulic fluid off and then on the check valves will be opened and fluid communication will be provided between the source and the implement to be operated.

In the operation of the implement it is not uncommon for hydraulic surges to occur in the fluid lines and as a result sometimes the check valves close intermittently with resulting intermittent malfunctioning of the implement being operated. If the surges are of sufficient magnitude the check valves may be totally locked closed with the result that the fluid source must be turned off and on again to reopen the check valves. The check valve in the male coupler is particularly susceptible to this problem.

The present invention therefore addresses itself to the above problem and provides a positive mechanical connection which engages the male coupler check valve to positively prevent closing of the same under conditions of hydraulic fluid flow through the couplers. The mechanical connection is locked in its active position by fluid pressure in the female coupler which finds its way to an actuating chamber through a control valve which is either open or closed depending on the position of the female coupler check valve.

U.S. Pat. No. 3,477,468, patented Nov. 11, 1969 contains a disclosure of a coupler of the general type described above. This patent discloses structure which attempts to solve the problem of the check valves freezing or locking by providing a spring urged detent in the mechanism which interconnects the two check valves. In this structure if the hydraulic surges overcome the resistance of the detent the check valve will still lock or freeze resulting in intermittent operation. In the present disclosure there is a positive mechanical connection which prevents freeze up of the male check valve.

It is therefore an object of the present invention to provide a coupler of the type described which prevents closing of the check valves during operation.

Another object is to provide a positive mechanical connection to the male check valve which assures that the valve will not close during operation.

Another object is to provide a hydraulic means of locking the above-mentioned positive mechanical connection in place in its active condition.

Another object is to provide a control valve which controls the flow of hydraulic fluid to the hydraulic means of locking, which valve includes a portion of the check valve in the female coupler.

A still further object is to provide a coupling device which is economical of manufacture and which is reliable and durable in use.

Other objects and a fuller understanding of this invention may be had by referring to the following description and claims, taken in conjunction with the accompanying drawings, in which:

FIG. 1 is an elevational view in cross section of a coupling constructed in accordance with the teachings of the present invention. The male and female couplers have not yet been connected and there is no pressure in either coupler.

FIG. 2 is a view showing the couplers connected and with both couplers pressurized.

FIG. 3 is a view similar to FIG. 2 but with the female coupler depressurized causing the female coupler check valve to move to open position.

FIG. 4 is a view similar to FIG. 3 but with the female coupler repressurized causing the male coupler check valve to open and causing fluid to travel to the hydraulic locking means.

Figure 5:
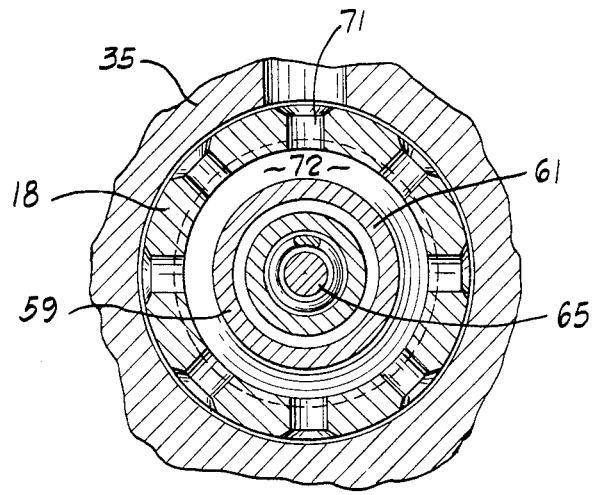
FIG. 5 is a view taken generally along the line 5—5 of FIG. 1.
Figure 6:
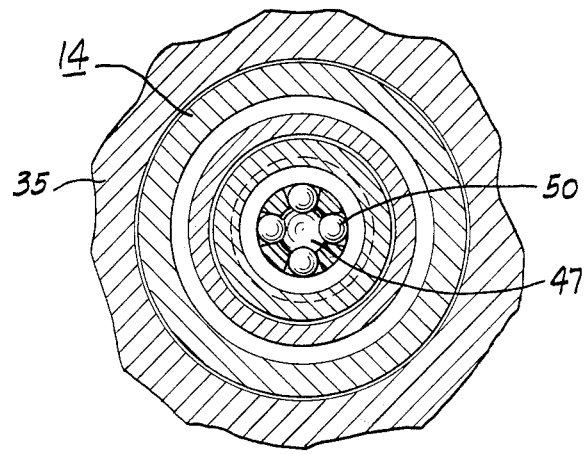
FIG. 6 is a view taken generally along the line 6—6 of FIG. 1.

The coupling device of the present invention has been indicated generally in the drawings by the reference numeral 10 and includes in combination a female coupler 14 and a male coupler 15 capable of being releasably connected together by axial movement of the two relative to each other. FIG. 1 shows the two coupler parts in disconnected condition. Connection of the two is accomplished by moving the male coupler 15 axially toward and into the female coupler to the positions shown in FIGS. 2, 3 and 4. In the condition of FIG. 1 the check valves in both the female and male couplers are closed which is the condition of the valves whether there is fluid pressure in the coupler parts or whether there is no fluid pressure in the coupler parts.

The female coupler 14 comprises generally a housing having first and second end portions as well as an intermediate portion therebetween which parts are identified by the reference numerals 19, 20 and 21 respectively. Wall means define a bore 24 which extends axially through the housing 18 and as will be noted from the drawings this bore 24 has various portions of different diameters. The bore 24 at the first end portion 19 defines a cavity 26 for the reception of the end of the male coupler 15 as best observed in FIGS. 2, 3 and 4.

A plurality of circumferentially spaced and generally radially extending holes 29 are provided in the first end portion of the housing and serve to receive a corresponding number of detents 28 in the shape of balls which detents are adapted to releasably connect the male coupler 15 when it has been received in the cavity 26 in the female coupler as best seen in FIGS. 2, 3 and 4. A first locking sleeve 32 surrounds the detents 28 and in a first position namely that position of FIGS. 2, 3 and 4 it serves by means of a flat surface 33 to hold the detents 28 projecting into the bore.

The locking sleeve 32 is secured by threads 34 in a fixed position to a mounting block 35 which for example may be fixedly mounted to a farm tractor or other similar device with which the device of the present invention is adapted to be associated. It will be seen that the coupling device of the present invention is adapted to be received within a cylindrical bore in the mounting block 35.

The housing 18 is adapted to move slightly axially with respect to the bore in mounting block 35 in which it resides to enable one to connect the male coupler to the female coupler with the use of only one hand. To this end the male coupler is urged into cavity 26 by a workman until a wall 37 on the male coupler 14 engages the detents 28. When this occurs the detents are prevented from moving radially outwardly by the action of the flat surface 33 on the locking sleeve 32. As a result the housing 18 moves axially to the left as viewed in FIG. 1 slightly against the pressure of spring 36 until the detents 28 come into alignment with space 39 on the locking sleeve at which time the detents are moved radially outwardly permitting the detents 28 to come into alignment with groove 88 on the male coupler. Under these conditions the male and female couplers are locked together when the axial pressure is released because the housing 18 then moves back to the right as viewed in FIG. 1 with the detents 28 contained in groove 88 and with the flat surface 33 holding the detents 28 in this position.

Accordingly when it is desired to disconnect the two coupler parts all that a workman need do is exert an axial force on the male coupler 15 to the right as seen in FIG. 1 which causes housing 18 to move to the right bringing detents 28 into alignment with the space 41 which permits the detents 28 to move radially outwardly and thus removed from the groove 88 permitting disconnection of the two coupler parts.

A closure member 38 is positioned in the second end portion of the bore 24 and serves to close the bore at the left end of the housing as viewed in FIGS. 1-4. The closure member is held in position by means of a snap ring 43. The closure member has a reduced diameter portion 40 which extends generally axially in the bore toward the first end portion of the housing and defines between the O.D. thereof and the I.D. of the bore, a chamber 42. Annular wall means are provided on the reduced diameter portion and serve to define a cylindrical cavity 47 which opens in a direction facing the first end portion of the housing. Radially extending openings 51 are provided in the annular wall means 45 and serve to carry a corresponding number of circumferentially spaced detents 50 therein with these detents 50 being in the shape of balls as are detents 28.

A locking sleeve 55 surrounds the detents 50 and in a first position holds the detents 50 projecting into the cavity 47 and in a second position permitting removal of the detents 50 from the cavity. The first position of this sleeve is shown in FIG. 4 and the second position of this sleeve is illustrated in FIGS. 1, 2 and 3. A spring 56 serves to constantly urge the locking sleeve 55 to the referred to second position.

An annular shield member 59 is threadably secured to the second end portion of the housing and for description purposes can be said to include the second end portion of the housing at least in part and has a portion which extends into the intermediate portion 21 of the housing bore and serves to define a cylindrical opening which faces in the direction of the first end portion of the housing. An annular female check valve 61 is located within the annular shield member and is axially movable relative to the shield member in travelling between open and closed positions. A spring 63 acts between the female check valve 61 and the shield member to constantly urge the female check valve to its closed position. The closed position of the female check valve is illustrated in FIGS. 1 and 2 and the open condition of this valve is illustrated in FIGS. 3 and 4.

An actuating member 65 which is generally cylindrical in shape is located within the annular female check valve 61 and is axially movable between first and second positions. The first position of the actuating member is illustrated in FIGS. 2 and 3 and the second position is illustrated in FIG. 4. The actuating member is provided with first and second end portions 66 and 67 respectively and a spring means 69 acts between the actuating member and the female check valve urging the two in opposite axial directions. The shoulders on the respective parts which engage opposite ends of the spring 69 are best seen from viewing the drawings. A snap ring 70 carried in a groove in the female check valve 61 and engagable with a shoulder on the actuating member serves to limit axial movement of the actuating member to the right as viewed in position of FIG. 1.

An annulus 72 is formed between the outer diameter of the shield member 59 and the bore 24 and a fluid pressure inlet 71 is formed in the housing 18 and provides for the introduction of fluid pressure into the annulus from a source of hydraulic fluid pressure, for example the hydraulic pump on a farm tractor. A fluid passage 73 is formed between the outer diameter of the female check valve 61 and the inner diameter of the shield member and serves to provide for the passage of hydraulic fluid from the source to the chamber 42 within which the locking sleeve 55 resides. Valve means 76 are provided in the fluid passage 73 and comprises a flat portion on the female check valve and an O-ring secured on the inner diameter of the shield member. This valve means 76 is movable between open and closed positions with the closed position being illustrated in FIGS. 1 and 2 and the open position being illustrated in FIGS. 3 and 4.

The male coupler 15 comprises a housing 79 having wall means which define a bore 80 which extends therethrough. The right end of the bore as illustrated in FIGS. 1-4 is adapted to be fluidly connected to a farm implement to be operated from the hydraulic fluid source which implement might, for example, be the lift mechanism on a plow.

An annular male check valve 84 is mounted in the housing 79 and is movable between open and closed positions with the closed position being illustrated in FIGS. 1-3 and the open position being illustrated in FIG. 4. A spring 86 constantly urges the check valve 84 toward closed position.

The two coupler parts are connected by axially inserting the male coupler 15 into the female coupler 14 as briefly described hereinabove which causes the detents 28 to be received in the groove 88 which prevents the coupler parts from becoming disassembled. The FIG. 1 position of the couplers illustrates the position of the respective valves 61 and 84 whether there is hydraulic pressure present in the couler parts or whether there is an absence of hydraulic pressure in the coupler parts. In short, the check valves in the two parts are closed. Assuming, for example, that the male and female couplers are under pressure, FIG. 2 illustrates the condition of the parts as the male coupler is inserted into connected position in the bore of the female coupler. The male check valve 84 engages the extreme right end of the first end portion 66 of the actuating member 65 causing it to move to the left to its first position. The detents 50 are engaged by the second end portion 67 of the actuating member and since the locking sleeve is in its extreme right hand position the detents 50 are moved out of the cylindrical cavity 47.

If in the just previously described assembly there is no hydraulic pressure in the female coupler 14 the position of the respective parts would be as illustrated in FIG. 3.

Still assuming the assembly under the conditions as described in the assembly of FIG. 2, it is next desired to transmit hydraulic fluid pressure from the pressure source, namely in through the inlet 71 through the female coupler and thence to and through the male coupler and to the implement to be operated. To accomplish this end, hydraulic fluid pressure is released or turned off from the inlet 71 in the condition of the couplers shown in FIG. 2 which causes the female check valve 61 to move from the closed position of FIG. 2 to the open position illustrated in FIG. 3. This is accomplished because of the action of spring 69 which has a force greater than the force of spring 63 and due to the fact that fluid pressure has been relieved and is not acting on the female check valve tending to close the same.

The next step is to reinstitute hydraulic fluid pressure to the female coupler through inlet 71 after the parts have moved to the position of FIG. 3 which causes fluid pressure to act against the male check valve (FIG. 4) 84 opening the same with subsequent flow of hydraulic fluid pressure to the implement being operated. At the same time the actuating member 65 moves to its second position which permits detents 50 to drop into the cylindrical cavity 47. Hydraulic fluid pressure is transmitted under these same set of circumstances through the fluid passage 73, past valve means 76 which is in the open position to the chamber 42. This fluid pressure which is transmitted to chamber 42 act on the end face of locking sleeve 55 causing the locking sleeve to move to the left or the position of FIG. 4. In this position the detents 50 are prevented from moving out of the cylindrical cavity 47 which in turn results in the fact that the actuating member cannot move back to its first position and under these conditions under no circumstances can the male check valve move to closed position.

If hydraulic fluid pressure is turned off to the female coupler under the conditions of the position of FIG. 4, pressure is relieved from chamber 42 causing movement of the locking sleeve 55 to the right to its position shown in FIG. 3. The other parts remain in the position of FIG. 4 because of the strength of spring 69 relative to the strength of the other springs. If the coupler parts are disconnected (FIG. 1) as above described, then the parts move to the position shown in FIG. 1.

It will thus be seen from the above description of the structure and operation of the device that the objects of the present invention are uniquely and conveniently carried out. In this particular structure there is provided a positive mechanical connection to the male check valve which under the circumstances of operation of the device absolutely mechanically locks the male check valve in open position.

This obviates malfunctioning of the device which in many instances is brought about by surges in the hydraulic fluid conduit which causes the male check valve to close or be frozen on its seat. Additionally, the construction and location of the female check valve in the present structure is convenient in that it is carried within the confines of the shield member and is not subject to the surges of hydraulic fluid tending to intermittently close the same.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a coupler having first and second coupler parts and first and second check valves respectively located therein which parts are capable of being coupled when the parts are under fluid pressure; the improvement of actuating means movable between first and second positions, said actuating means in one of said positions being operably connected to the check valve in one of the coupler parts to hold the check valve in open position in connected condition of the first and second coupler parts and under conditions of fluid flow through the connected coupler parts, said actuating means being separate from and movabale relative to the check valve in the other of the coupler parts, and fluid pressure actuated lock means for locking said actuating means in said one of said positions.

2. In a coupler as claimed in claim 1 wherein said actuating means and said lock means are located in the first coupler part, a fluid passage in the first coupler part providing for fluid communication between said lock means and a fluid pressure inlet in the first coupler part, a control valve in said fluid passage and movable between open and closed positions, said lock means being actuated by fluid pressure from the fluid pressure inlet when said control valve is in said open position.

3. In a coupler as claimed in claim 2 wherein said control valve is included as part of the check valve in the first coupler part, said control valve being in open position when the check valve in the first coupler part is open and closed when the check valve in the first coupler part is closed.

4. In a coupler as claimed in claim 3 wherein said actuating means comprises a rod-like member engageable at one end with the said check valve, the other end of said rod-like member movable in a cavity, said lock means including detents movable into said cavity to limit the movement of said rod-like member and a sleeve member to hold said detents in said cavity.

5. A coupling device comprising a female portion and a nipple portion movable between coupled and uncoupled positions, a first check valve in said female portion movable between open and closed positions, a second check valve in said nipple portion movable between open and closed positions, an actuating member located in said female portion and having first and second end portions, said actuating member being movable between first and second positions and relative to said first check valve, fluid pressure urged lock means for locking said actuating member in said second position with said first end portion thereof engaging said second check valve to positively hold said second check valve in open position when said female and nipple portions are coupled.

6. A coupling device as claimed in claim 5 wherein said lock means includes an annular member defining a bore and surrounding said second end portion of said actuating member, a plurality of circumferentially spaced openings in said annular member, detents located in said openings and in the first position of said actuating member engaging the external surface thereof, said detents in said second position of said actuating member extending into said bore and preventing movement of said actuating member to said first position, sleeve means surrounding said detents and movable between first and second positions, said sleeve means in said first position preventing removal of said detents from said bore and in second position permitting removal of said detents from said bore.

7. A coupling device as claimed in claim 6 wherein said first check valve includes a fluid passage which transmits fluid pressure in said female portion to said sleeve means to move said sleeve means to said first position.

8. A coupling device as claimed in claim 7 wherein a control valve is located in said fluid passage which is open in the open position of said first check valve and closed in the closed position of said first check valve.

9. A coupling device including in combination a female coupler and a male coupler capable of being releasably connected together by axial movement of the two relative to each other, said female coupler comprising a housing having first and second end portions and having a bore extending therethrough, said first end portion bore defining a cavity for the reception of said male coupler, means adapted to releasably connect said male coupler in said female coupler, annular wall means in said second end portion of said housing defining a cylindrical cavity which opens toward said first end portion, circumferentially spaced detents carried in openings in said annular wall means, a locking sleeve surrounding said second detents and in a first position holding said detents projecting into said cavity and in a second position permitting removal of said detents from said cavity, spring means urging said locking sleeve to said second position, an annular shield member extending from said second end portion of said housing into an intermediate portion of said bore and having an opening facing said first end portion of said housing, an annular female check valve located within said annular shield member and axially movable relative to said shield member in travelling between open and closed positions, spring means urging said female check valve to closed position, an actuating member located within said annular female check valve and axially movable between first and second positions, said actuating member having first and second end portions, spring means acting between said actuating member and said female check valve urging the same in opposite axial directions, a fluid pressure inlet to the bore of said housing, a fluid passage defined between the outer diameter of said annular female check valve and the inner diameter of said shield member, valve means in said fluid passage formed on portions of said female check valve and the inner diameter of said annular shield member and movable between open and closed positions, said male coupler comprising a housing having another bore extending therethrough, an annular male check valve located in said another bore and movable between open and closed positions, spring means urging said male check valve toward closed position, connection of said male and female couplers causing said male check valve to engage said first end portion of said actuating member causing said actuating member to move to its said first position and without fluid pressure in said female coupler said female check valve moves to open position as does said valve means in said fluid passage, connection as above-described with fluid pressure in said female coupling causing said actuating member to move to its said first position and said female check valve to be closed as well as said valve means in said fluid passage.

10. A coupling device including in combination a female coupler and a male coupler capable of being rereleasably connected together by axial movement of the two relative to each other, said female coupler comprising a housing having first and second end portions and having a bore extending therethrough, said first end portion bore defining a cavity for the reception of said male coupler, first circumferentially spaced detents carried in said first end portion and adapted to releasably connect said male coupler in said female coupler, a first locking sleeve surrounding said first detents and in a first position holding said first detents projecting into said bore and in a second position permitting removal of said first detents from said bore, a closure member located in said second end portion bore and closing said bore, said closure member having a reduced diameter portion extending axially in said bore and defining therebetween a chamber, annular wall means on said reduced diameter portion and defining a cylindrical cavity in said reduced diameter portion which opens toward said first end portion, second circumferentially spaced detents carried in openings in said annular wall means, a second locking sleeve surrounding said second detents and in a first position holding said second detents projecting into said cavity and in a second position permitting removal of said second detents from said cavity, spring means urging said second locking sleeve to said second position, an annular shield member extending from said second end portion of said housing into an intermediate portion of said bore and having an opening facing said first end portion of said housing, an annular female check valve located within said annular shield member and axially movable relative to said shield member travelling between open and closed positions, spring means urging said female check valve to closed position, an actuating member located within said annular female check valve and axially movable between first and second positions, said actuating member having first and second end portions, spring means acting between said actuating member and said female check valve urging the same in opposite axial directions, a fluid pressure inlet to the bore of said housing entering into an annulus formed between an outer diameter of said shield member and said bore, a fluid passage defined between the outer diameter of said annular female check valve and the inner diameter of said annular shield member, valve means in said fluid passage formed on portions of said female check valve and the inner diameter of said annular shield member and movable between open and closed positions, said male coupler comprising a housing having another bore extending therethrough, an annular male check valve located in said another bore and movable between open and closed positions, spring means urging said male check valve toward closed positions, circumferentially extending groove means on the exterior of said male coupler housing to receive said first detents when said female and male couplers are connected, connection of said male and female couplers causing said male check valve to engage said first end portion of said actuating member causing said actuating member to move to its said first position and without fluid pressure in said female coupler, said female check valve moves to open position as does said valve means in said fluid passage, connection as above-described with fluid pressure in said female coupling causing said actuating member to move to its said first position and said female check valve to be closed as well as said valve means in said fluid passage, release of fluid pressure in said female coupler after connection as just last described above causing said female check valve and said valve means in said fluid passage to open and then reinstituting fluid pressure in said female coupler causing said male check valve to be forced open; said actuating member to move to its said second position with said second detents projecting into said cavity and movement of said second locking sleeve to its said first position to hold said second detents in said cavity by the action of fluid pressure from said fluid pressure inlet travelling to said first chamber and acting on said second locking sleeve, and in this condition positively preventing movement of said male check valve to closed position.

* * * * *